(12) United States Patent
Hamada et al.

(10) Patent No.: US 7,151,953 B2
(45) Date of Patent: Dec. 19, 2006

(54) COMMUNICATION APPARATUS HAVING A LIGHT EMITTING UNIT THAT EMITS LIGHT IN A VARIETY OF COLORS

(75) Inventors: Yoji Hamada, Daito (JP); Hiroko Nakamura, Osaka (JP)

(73) Assignees: Sanyo Electric Co., Ltd., Osaka (JP); Sanyo Telecommunications Co., ltd., Osaka (JP)

( * ) Notice: Subject to any disclaimer, the term of this patent is extended or adjusted under 35 U.S.C. 154(b) by 588 days.

(21) Appl. No.: 10/329,606

(22) Filed: Dec. 26, 2002

(65) Prior Publication Data

US 2003/0147113 A1    Aug. 7, 2003

(30) Foreign Application Priority Data

Dec. 27, 2001    (JP)    ............. 2001-398618

(51) Int. Cl.
*H04B 1/38* (2006.01)
*H04M 1/00* (2006.01)

(52) U.S. Cl. ............. 455/567; 455/566; 455/415; 455/412.2

(58) Field of Classification Search ............. 455/414.1, 455/414.4, 415, 575.1, 90.1, 566, 567, 90.2, 455/347, 412.2, 403, 462; 359/238; 340/7.51, 340/7.61; 379/162
See application file for complete search history.

(56) References Cited

U.S. PATENT DOCUMENTS

| 5,946,636 | A | * | 8/1999 | Uyeno et al. ............. 455/566 |
| 6,127,933 | A | * | 10/2000 | Ohmura et al. ........... 340/636.1 |
| 6,690,955 | B1 | * | 2/2004 | Komiyama ................. 455/566 |
| 6,720,863 | B1 | * | 4/2004 | Hull et al. .................. 340/7.51 |
| 6,882,713 | B1 | * | 4/2005 | Sakai et al. ............ 379/142.06 |
| 2003/0114150 | A1 | * | 6/2003 | Hayashi ..................... 455/418 |
| 2004/0116163 | A1 | * | 6/2004 | Kim et al. ............... 455/575.1 |
| 2004/0137954 | A1 | * | 7/2004 | Engstrom et al. ........... 455/566 |
| 2004/0140972 | A1 | * | 7/2004 | Hirota et al. ............... 345/204 |

FOREIGN PATENT DOCUMENTS

| GB | 2361798 | 10/2001 |
| JP | 2001-157254 | 6/2001 |
| JP | 2001-160864 | 6/2001 |
| JP | 2001-228825 | 8/2001 |
| JP | 2001-237945 | 8/2001 |
| KR | 2001-0062712 | 7/2001 |

* cited by examiner

*Primary Examiner*—Edan Orgad

(57) ABSTRACT

A communication apparatus of the present invention notifies a user that one of a plurality of events has occurred, and includes a first reception unit, a second reception unit, a detection unit, and a light emitting unit. The first reception unit receives from the user, for each time slot that composes a light emission pattern, designation of a light emission color or non-emission, as a light emission attribute of the time slot. The second reception unit receives a designation of an event to be corresponded with the light emission pattern. The detection unit detects that one of the plurality of events has occurred. The light emitting unit, when the detection unit detects that the event has occurred, emits light based on the light emission pattern designated in correspondence with the event.

12 Claims, 12 Drawing Sheets

FIG.3

| COLOR 1 | COLOR 2 | COLOR 1 | COLOR 2 | COLOR 1 | COLOR 2 |

FIG.6

| S1 | S2 | S1 | S2 | S1 | S2 |

FIG.11 PRIOR ART

| COLOR OF LIGHT EMITTED | RED LED | BLUE LED | GREEN LED |
|---|---|---|---|
| RED | ON | OFF | OFF |
| BLUE | OFF | ON | OFF |
| GREEN | OFF | OFF | ON |
| YELLOW | ON | OFF | ON |
| PURPLE | ON | ON | OFF |
| CYAN | OFF | ON | ON |
| WHITE | ON | ON | ON |

FIG.12

PRIOR ART

LED SETTINGS

1. INCOMING CALL    RED
2. ALARM    YELLOW
3. SCHEDULE    GREEN
4. INCOMING MAIL    CYAN
5. FAVORITE CALL    BLUE

COMMUNICATION APPARATUS HAVING A LIGHT EMITTING UNIT THAT EMITS LIGHT IN A VARIETY OF COLORS

BACKGROUD OF THE INVENTION (1) Field of the Invention

The present invention relates to a communication apparatus that has a light emitting unit that emits light in a variety of colors, and in particular to diversification of light emission patterns used to notify the user of the occurrence of events.

(2) Description of the Prior Art

Recently mobile telephones that include a light emitting unit that emits light in a variety of colors are becoming common.

The light emitting unit is composed of three LEDs (light emitting diodes) that emit light in red, blue and green respectively. The light emission color can be varied according to combinations of each LED being ON or OFF. FIG. 11 shows colors that the light emitting unit is able to emit according to combinations of the three LEDs being ON or OFF.

A mobile telephone having such a light emitting unit is able to receive a designation from a user to correspond colors emitted by the light emitting unit with events such as receiving a call and receiving mail. For example, an LED setting screen, which is a GUI (graphical user interface), is displayed on a display unit included in the mobile telephone, and through the screen the mobile telephone receives designations from the user for corresponding events with colors. By corresponding events with colors, when an event occurs, the user is able to judge what the event is according to the color emitted by the light emitting unit.

Examples of events that are notified to the user with use of light emission include "incoming call", "alarm", "schedule", "incoming mail", and "favorite call".

In the LED settings in FIG. 12, red is set for "incoming call". Therefore, when an incoming call is received, the light emitting unit emits a flashing red light to notify the user of the incoming call.

"Alarm" refers to a function where a sound and light are emitted at a time set by the user to notify the user that it is the set time. In FIG. 12, yellow is set for "alarm". Therefore, the light emitting unit emits a flashing yellow light at the set time.

"Schedule" is the "alarm" function with the addition of dates. A sound and light are emitted together on reaching the set date to notify the user that it is the set date. In FIG. 12, green is set for "schedule". Therefore, the light emitting unit emits a green flashing light when the set date is reached.

Cyan is set for "incoming mail". Therefore, when mail is received the light emitting unit emits a cyan flashing light to notify the user that mail has been received.

"Favorite call" is a function that enables a color that is different to the color ordinarily emitted when a call is received to be emitted when a call is received from a telephone number designated by the user. Both the USA and Japan have a caller information notification service that notifies the recipient of a call of the telephone number from which the call is being made, together with the call. Therefore, when the telephone number that is notified together with the call is the telephone number designated by the user in the "favorite call" settings, the light emitting unit emits light in the designated color. In this way, the user is able to judge who an incoming call is from according to the color emitted.

However, in a conventional mobile telephone, the user is able to correspond each event with only a single color, and the patterns in which the light flashes can only be selected from a limited number of predetermined patterns. Therefore, there is a demand from users for diversification of emission patterns.

This applies not only to mobile telephones, but also to communication apparatuses on the whole, such as landline telephones, that have a function emitting light to notify a user of the occurrence of an event.

SUMMARY OF THE INVENTION

In order to address the above-described demand, the object of the present invention is to provide a communication device that enables diversification of light emitting unit light emission patterns.

In order to achieve the stated object, the communication apparatus of the present invention is a communication apparatus that notifies a user that one of a plurality of events has occurred, including: a first reception unit operable to receive from the user, for each time slot that composes a light emission pattern, designation of a light emission color or non-emission, as a light emission attribute of the time slot; a second reception unit operable to receive a designation of an event to be corresponded with the light emission pattern; a detection unit operable to detect that one of the plurality of events has occurred; and a light emitting unit operable, when the detection unit detects that the event has occurred, to emit light based on the light emission pattern designated in correspondence with the event.

The stated structure enables the user to create light emission patterns by combining a plurality of colors, thereby enabling diversification of light emission patterns. If a large amount of light emission patterns are stored in the mobile telephone in advance for the user to select from, the user may have trouble remembering which light emission pattern he/she has put in correspondence with which event, particularly because light emission patterns are more difficult to distinguish between than, for example, ringer tones (i.e., melodies and the like). However, the present invention enables the user to correspond light emission patterns created using his/her own ideas with events. This means that it is less likely that the user will forget which light emission patterns are corresponded with which events, and eliminates the need to store a large amount of light emission patterns in advance in the communication apparatus.

Here, the communication apparatus may further include a third reception unit operable to receive from the user designation of a length of each time slot.

The stated construction enables the user to designate the length of each time slot in the light emission pattern, thereby achieving diversification of light emission patterns.

BRIEF DESCRIPTION OF THE DRAWINGS

These and other objects, advantages and features of the invention will become apparent from the following description thereof taken in conjunction with the accompanying drawings which illustrate a specific embodiment of the invention.

In the drawings:

FIG. 3 shows a light emission pattern structure of the first embodiment;

FIG. 6 shows a light emission pattern structure of the second embodiment;

FIG. 11 shows a conventional LED setting screen; and

FIG. 12 shows a table of the colors that the light emitting unit is capable of emitting.

DESCRIPTION OF THE PREFERRED EMBODIMENTS

The following describes embodiments of the communication apparatus of present invention with reference to the drawings.

1. First Embodiment 1.1 Structure

Figure 1:
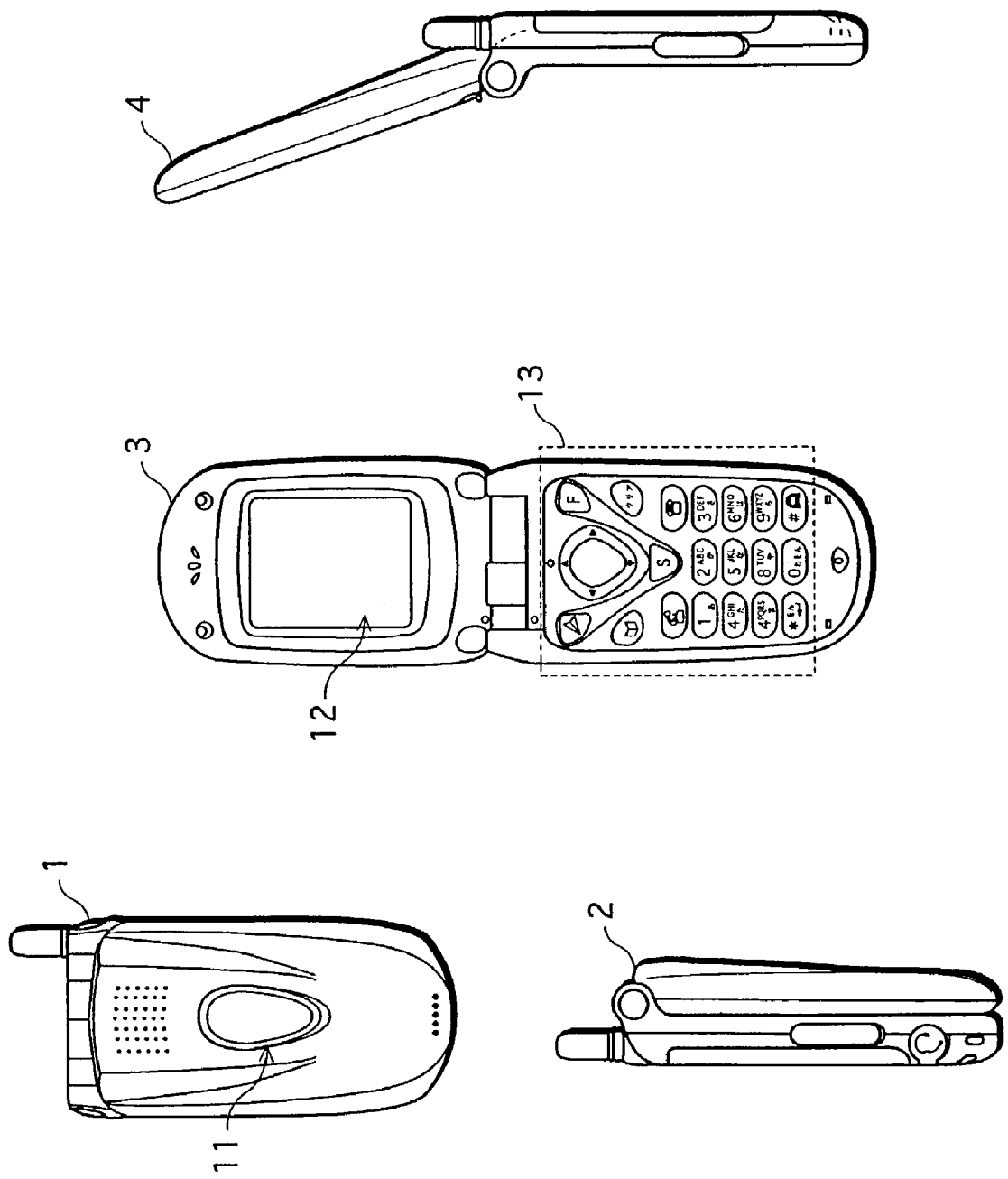
FIG. 1 shows an example of the appearance of the communication device of the present invention.

FIG. 1 shows the appearance of a communication apparatus of the first embodiment. The communication apparatus is a folding mobile telephone composed of two pieces of housing that are joined by a hinge which enables the housing to be folded. In addition to transmitting and receiving calls, the communication apparatus has functions such as mail transmission and reception, an alarm, a schedule function, and a favorite call function. These functions are present in conventional mobile telephones, and therefore a description thereof is omitted.

In FIG. 1, 1 shows a top view of the communication device when folded, 2 shows a side view of the communication device when folded, 3 shows a top view of the communication device when unfolded, and 4 shows a side view of the communication device when unfolded.

Figure 2:
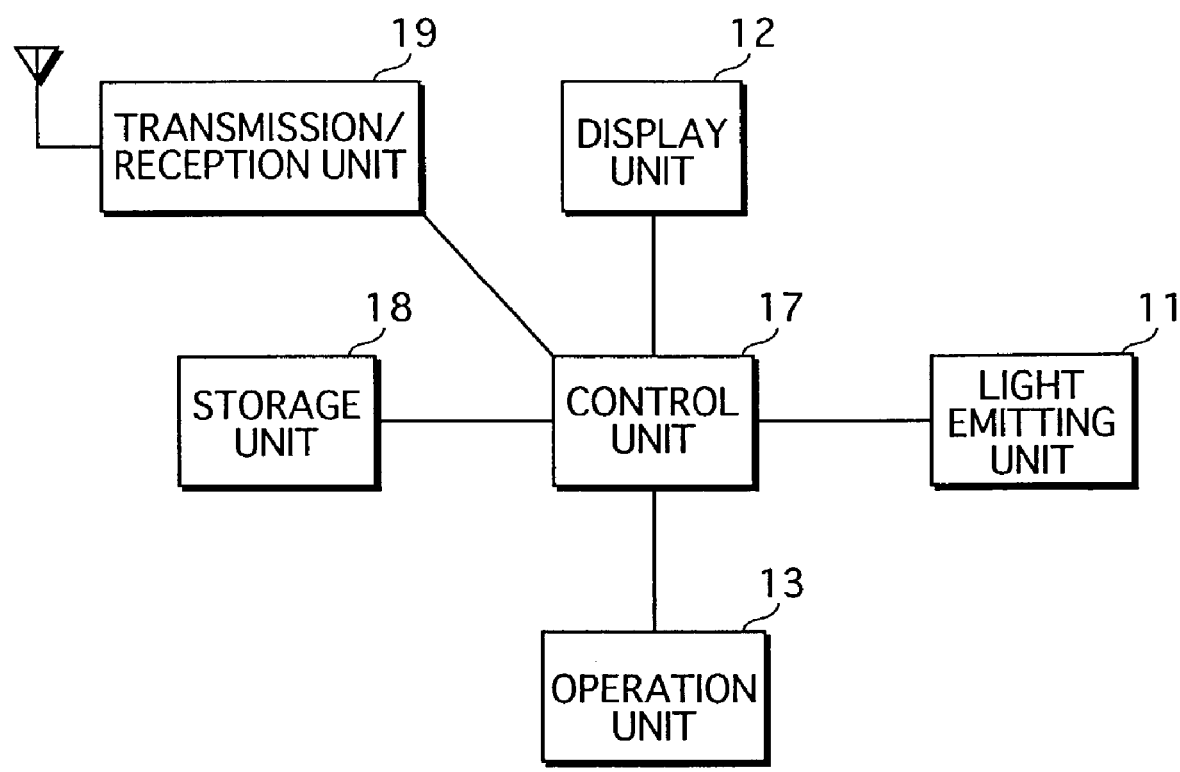
FIG. 2 is a block structure diagram of the communication apparatus of the present invention.

FIG. 2 is a diagram showing the function structure of the communication apparatus of the present invention. Descriptions of function units that are not necessary to describe the features of the present invention are omitted.

The communication apparatus includes a light emitting unit 11, a display unit 12, an operation unit 13, a control unit 14, a storage unit 15 and a transmission/reception unit 16.

The light emitting unit 11 is composed of three LED elements that emit red, blue and green light respectively. The light emitting unit 11 is capable of emitting a plurality of different colors of light according to whether each LED element is ON or OFF. The light emitting unit 11 is connected to the control unit 14, and emits light according to instructions from the control unit 14. The light emitting unit 11 is capable of emitting light in the seven colors shown in FIG. 12.

One specific example of the light emitting unit is a chip LEDHL006-W11-SA1 manufactured by Koha Co., Ltd. The LEDHL006-W11-SA1 is composed of four terminals: a common anode, a red cathode, a green cathode and a blue cathode, and includes three LEDs. The colors emitted respectively emitted by the three LEDs are the three primary colors: red, green and blue.

The display unit 12 is a liquid crystal display (LCD) which is connected to the control unit 14 and displays screens according to instructions from the control unit 14.

The operation unit 13 is connected to the control unit 14, and includes various operation buttons such as numeric keys 0 to 9, an LED setting button (hereinafter referred to as the "F button"), a notification setting button (hereinafter referred to as the "S button"), and a cross button. The function of each operation button is allocated by the control unit 14. When one of the operation buttons is pressed by the user, the operation unit 13 detects the press, and sends a signal designating the pressed operation button to the control unit 14.

The control unit 14 is composed of a CPU (central processing unit), a ROM (read only memory), a RAM (random access memory), and so on. The CPU 14 performs control according to a control program stored in the ROM. This control includes control relating to calls. Furthermore, the control unit 14 includes a detection function for detecting occurrence of an event such as an incoming call, incoming mail, a set alarm time, a set schedule date and an incoming call from a telephone number set as "favorite call".

The control unit 14 also receives signals from the operation unit 13 and controls so as to reflect the user's instructions. The control unit 14 is connected to the light emitting unit 11, the display unit 12, the operation unit 13, the storage unit 15 and the transmission/reception unit 16.

The storage unit 15 is an EPROM (erasable programmable read only memory) that stores address information that corresponds communication addresses such as telephone numbers and mail addresses with names, light emission patterns created by the user, and so on. Original light emission patterns have a structure in which two colors are emitted alternately, as shown in FIG. 3. The user is able to create an original light emission pattern by selecting from among the seven colors that the light emitting unit 11 is capable of emitting, and non-emission.

The transmission/reception unit 16 is connected to the control unit 14, and has functions of performing transmission and reception of communication data, modulating communication data to be transmitted and demodulating received communication data. Here, communication data denotes call audio data, mail packet data, control data used in communication control, and so on.

1.2 Operations

Figure 4:
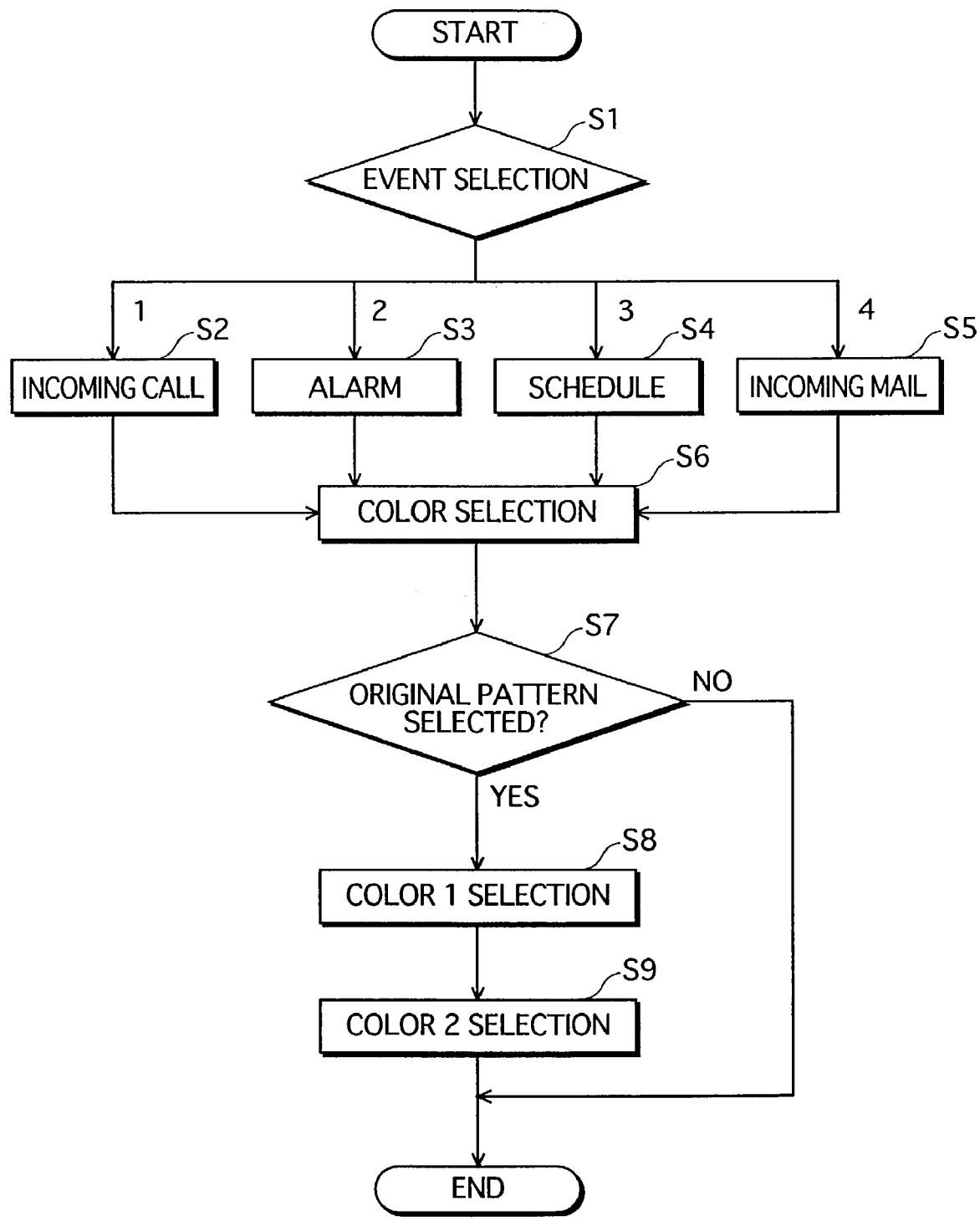
FIG. 4 is a flowchart showing operations relating to LED settings for events in the first embodiment.

The following describes operations relating to LED settings for events, in the communication apparatus of the present invention. FIG. 4 is a flowchart showing operations relating to LED settings for events in the first embodiment, and FIG. 5 is a transition diagram of LED setting screens in the first embodiment.

Figure 5:
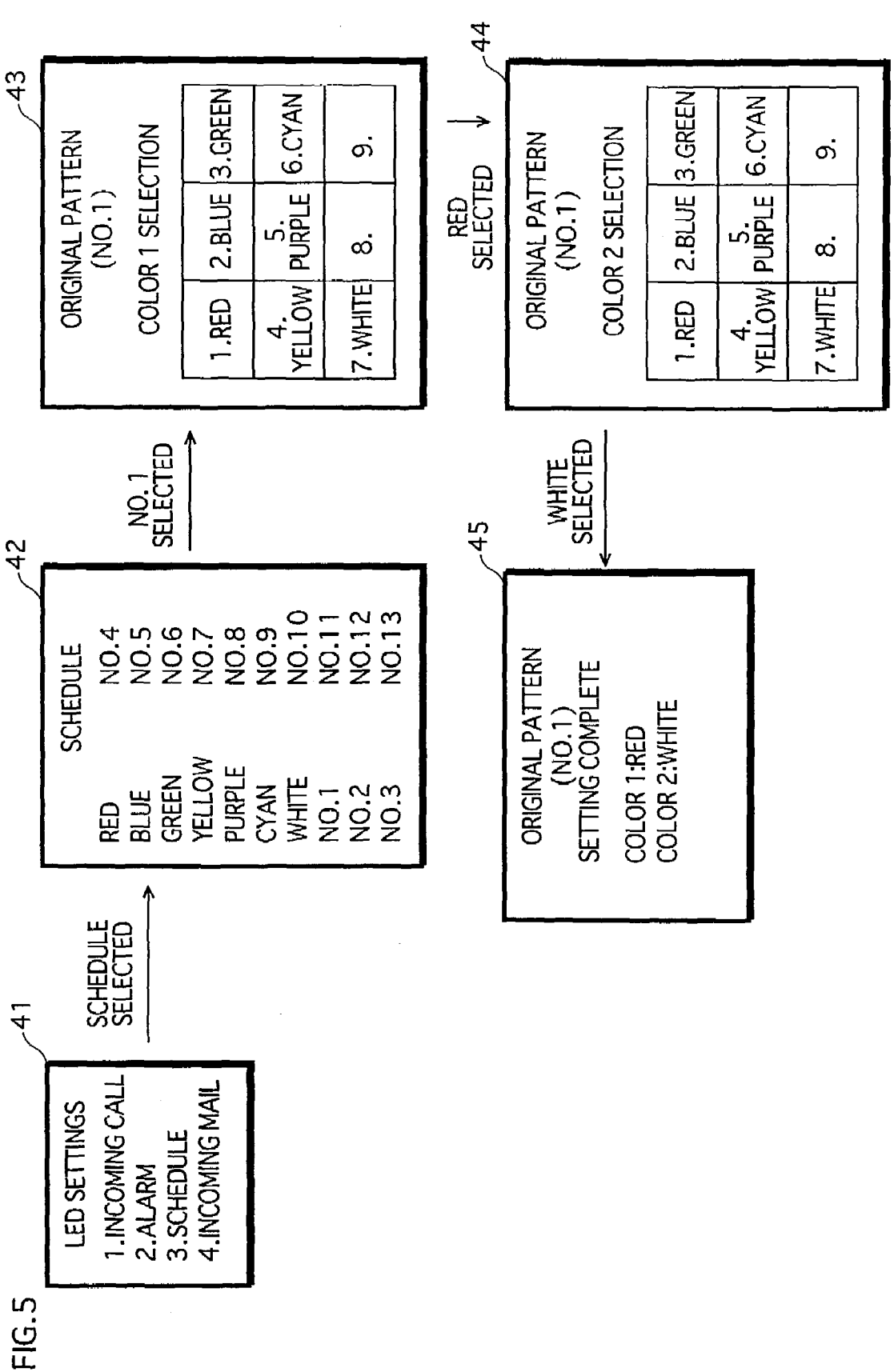
FIG. 5 is a transition diagram of LED setting screens of the first embodiment.

On the user pressing the F button in the operation unit 13 of the communication apparatus, the communication apparatus displays an LED setting screen on the display unit 12 (41 in FIG. 5). The LED setting screen displays the following: 1. INCOMING CALL, 2. ALARM, 3. SCHEDULE, 4. INCOMING MAIL. The user selects the event for which LED setting is to be performed, by pressing the numeric key of the number that is assigned to the event (step S1). The user is able to select incoming call LED setting by pressing the "1" button (step S2), alarm LED setting by pressing the "2" button (step S3), schedule LED setting by pressing the "3" button (step S4), and incoming mail LED setting by pressing the "4" button (step S5).

After receiving the selection of the event from the user, the communication apparatus receives a selection of the color of light to be emitted to notify the user of the event, from the user (step S6). For example, when the user selects schedule LED setting, the communication apparatus displays the screen shown by 42 in FIG. 5 on the display unit 12. As shown by 42 in FIG. 5, the user is able to select from the seven colors red, blue, green, yellow, purple, cyan and white, and also a light emission pattern from original light emission patterns No. 1 to No. 13.

The user views the screen displayed by the display unit 12, and selects a light emission pattern by operating the cross key button. Here, on the user selecting a pattern from among No. 1 to No. 13, the communication device proceeds to an original light emission pattern creation procedure (step S7: Yes).

The communication apparatus receives a selection of color 1 from the user (step S8), and then receives a selection of color 2 from the user (step S9). Specifically, the communication apparatus displays a screen shown by 43 in FIG. 5 on the display unit 12, and the user views a table that corresponds the numbers in the numeric keypad with the colors to select a color. On the user selecting color 1, the communication apparatus displays a screen for selecting color 2 on the display unit 12 (44 in FIG. 5). On the user selecting color 2, the communication apparatus displays notification that the original light emission pattern setting is complete, and the names of the two selected colors, as shown by 45 in FIG. 5. Here, the control unit 14 performs control so as to have the light emitting unit 11 repeatedly emit light for a predetermined length of time as a demonstration, based on the set original light emission pattern.

On the other hand, selecting a color at step S7 (step S7: No), means that the selected light emission pattern is a pattern that has flashing light emitted in the single selected color, and the LED setting is complete. Here, the control unit 17 performs control so as to have the light emitting unit 11 repeatedly emit light for a predetermined length of time as a demonstration, based on the set single color light emission pattern.

The described operations enable the user to create light emission patterns that combine two colors, and the created light emission pattern to be used to notify events.

2. Second Embodiment

The following describes a communication apparatus of the second embodiment. The structure of the communication apparatus of the second embodiment is the same as that of the first embodiment, and therefore only the operations which differ from the first embodiment are described.

Figure 6:
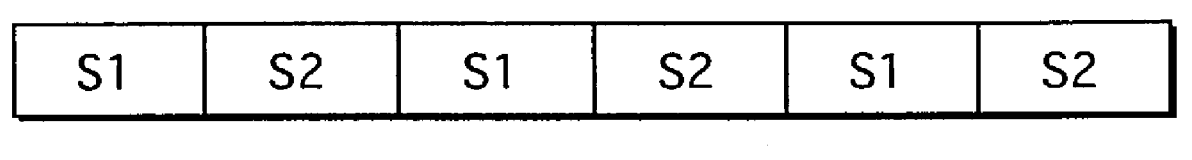

The communication apparatus of the first embodiment receives designations of two colors from the user to create an original light emission patterns. However the communication apparatus of the second embodiment receives designations from the user of the time length of the two time slots in an original light emission pattern to create diverse original light emission patterns. As shown in FIG. 6, each light emission pattern in the second embodiment is composed of two time slots: time slot S1 and time slot S2.

Figure 7:
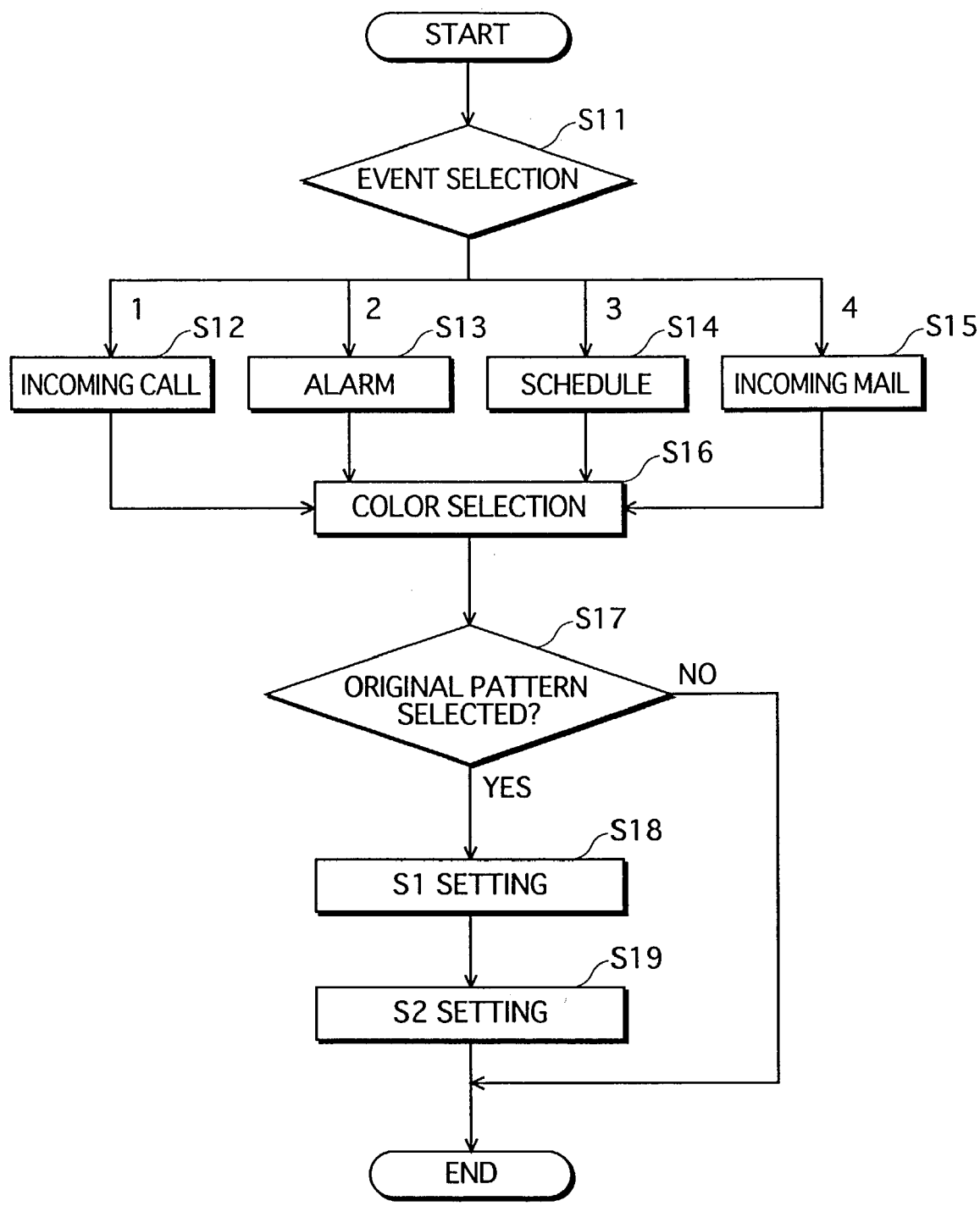
FIG. 7 is a flowchart showing operations relating to LED settings for events in the second embodiment.
Figure 8:
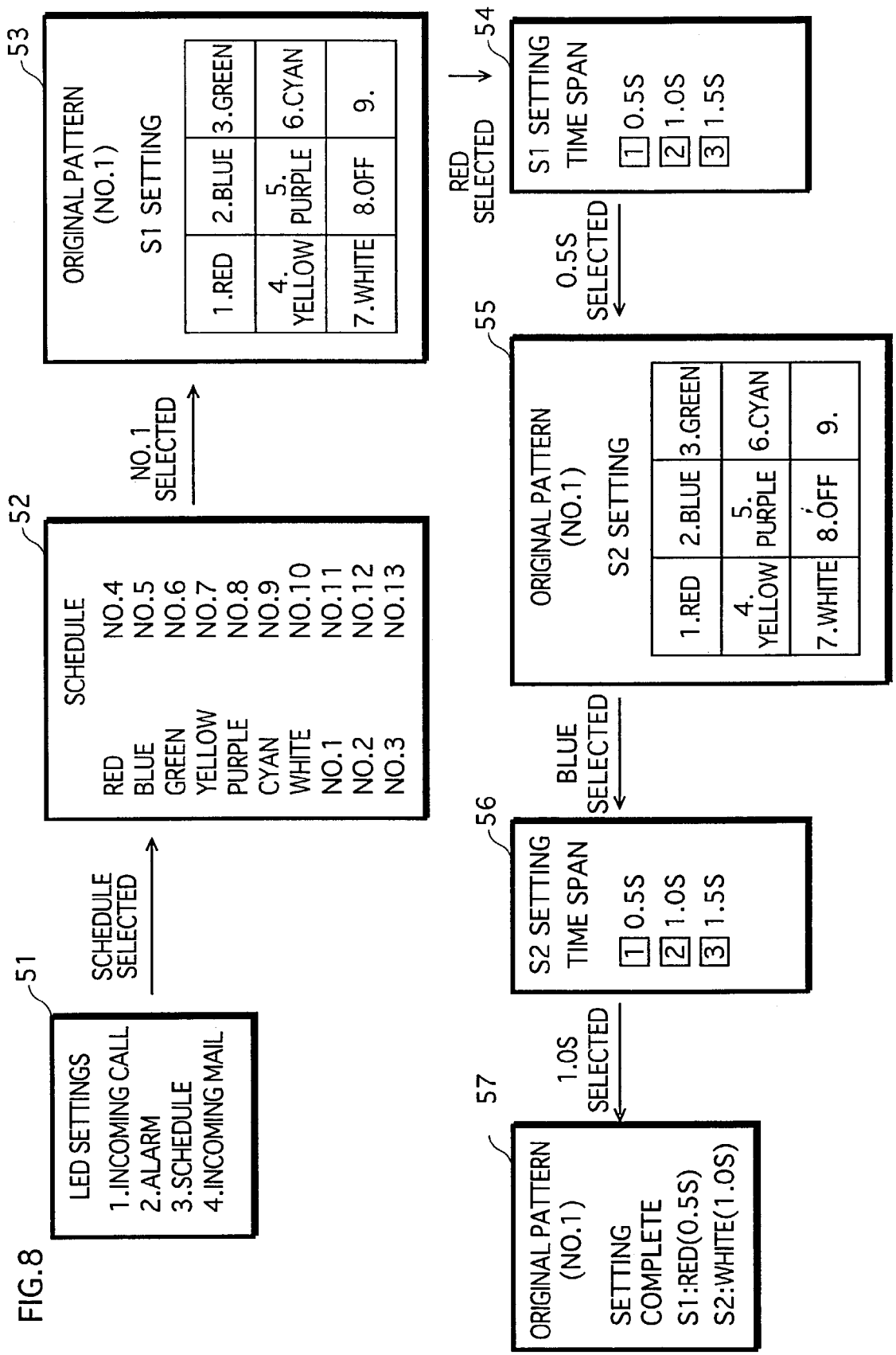
FIG. 8 is a transition diagram of LED setting screens of the second embodiment.

FIG. 7 is a flowchart showing operations relating to LED setting for events in the second embodiment, and FIG. 8 is an example of a transition diagram of LED setting screens in the second embodiment.

On the user pressing the F button in the operation unit 13 of the communication apparatus, the communication apparatus displays an LED setting screen on the display unit 12 (51 in FIG. 8). The LED setting screen displays the following: 1. INCOMING CALL, 2. ALARM, 3. SCHEDULE, 4. INCOMING MAIL. The user selects the event for which LED setting is to be performed, by pressing the numeric key of the number that is assigned to the event (step S11). The user is able to select incoming call LED setting by pressing the "1" button (step S12), alarm LED setting by pressing the "2" button (step S13), schedule LED setting by pressing the "3" button (step S14), and incoming mail LED setting by pressing the "4" button (step S15).

After receiving the selection of the event from the user, the communication apparatus receives a selection of the color of light to be emitted to notify the user of the event, from the user (step S16). For example, when the user selects schedule LED setting, the communication apparatus displays the screen shown by 52 in FIG. 8 on the display unit 12. In addition to the seven colors red, blue, green, yellow, purple, cyan and white, the user is able to select a light emission pattern from original light emission patterns No. 1 to No. 13.

The user views the screen displayed by the display unit 12, and selects a light emission pattern by operating the cross key button. Here, on the user selecting a pattern from amongst No. 1 to No. 13, the communication device proceeds to an original light emission pattern creation procedure (step S17: Yes).

First, the communication apparatus receives selections of the color and time length of time slot S1 from the user (step S18). Next, the communication apparatus receives selections of the color and time length for time slot S2 (step S19).

Specifically, the communication apparatus displays a screen on the display unit 12 such as that shown by 53 in FIG. 8, and views a table that corresponds the numbers of the numeric keys with the colors, to select a color for time slot S1. In receiving the selection of the color for time slot S1, the communication apparatus displays the screen for selecting a time length for time slot S1 (54 in FIG. 8). The user selects one time from among 0.5 seconds, 1.0 second and 1.5 seconds. When the selection of the color and time length for time slot S1 is complete, the communication apparatus receives selections of the color and time length for time slot S2 (55 and 56 in FIG. 8).

After finishing receiving the selection of color and time for time slot S2, the communication apparatus displays notification that the original light emission pattern setting is complete, and the respective colors and time lengths for time slots S1 and S2. Here, the control unit 14 performs control so as to have the light emitting unit 11 repeatedly emit light for a predetermined length of time as a demonstration, based on the set original light emission pattern.

On the other hand, selecting a color at step S17 (step S17: No), means that the selected light emission pattern is a pattern that has flashing light emitted in the single selected color, and the LED setting is complete. Here, the control unit 17 performs control so as to have the light emitting unit 11 repeatedly emit light for a predetermined length of time as a demonstration, based on the set single color light emission pattern.

The described operations enable the user to create numerous light emission patterns that combine not only seven conventional colors, but also a combination of time lengths and colors for the two time slots, and the created light emission patterns to be used to notify events.

Figure 9:
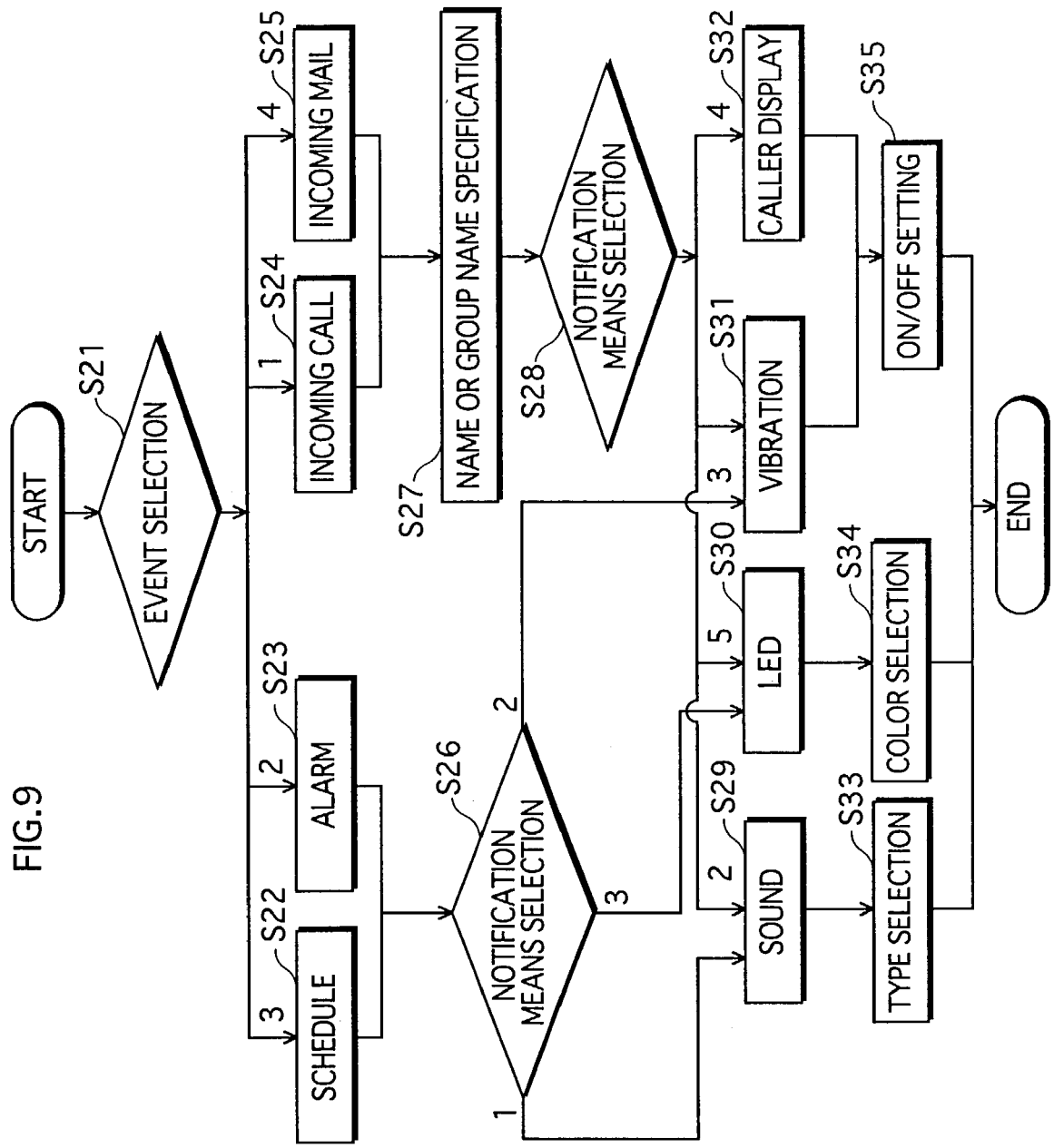
FIG. 9 is a flowchart relating to notification settings.
Figure 10:
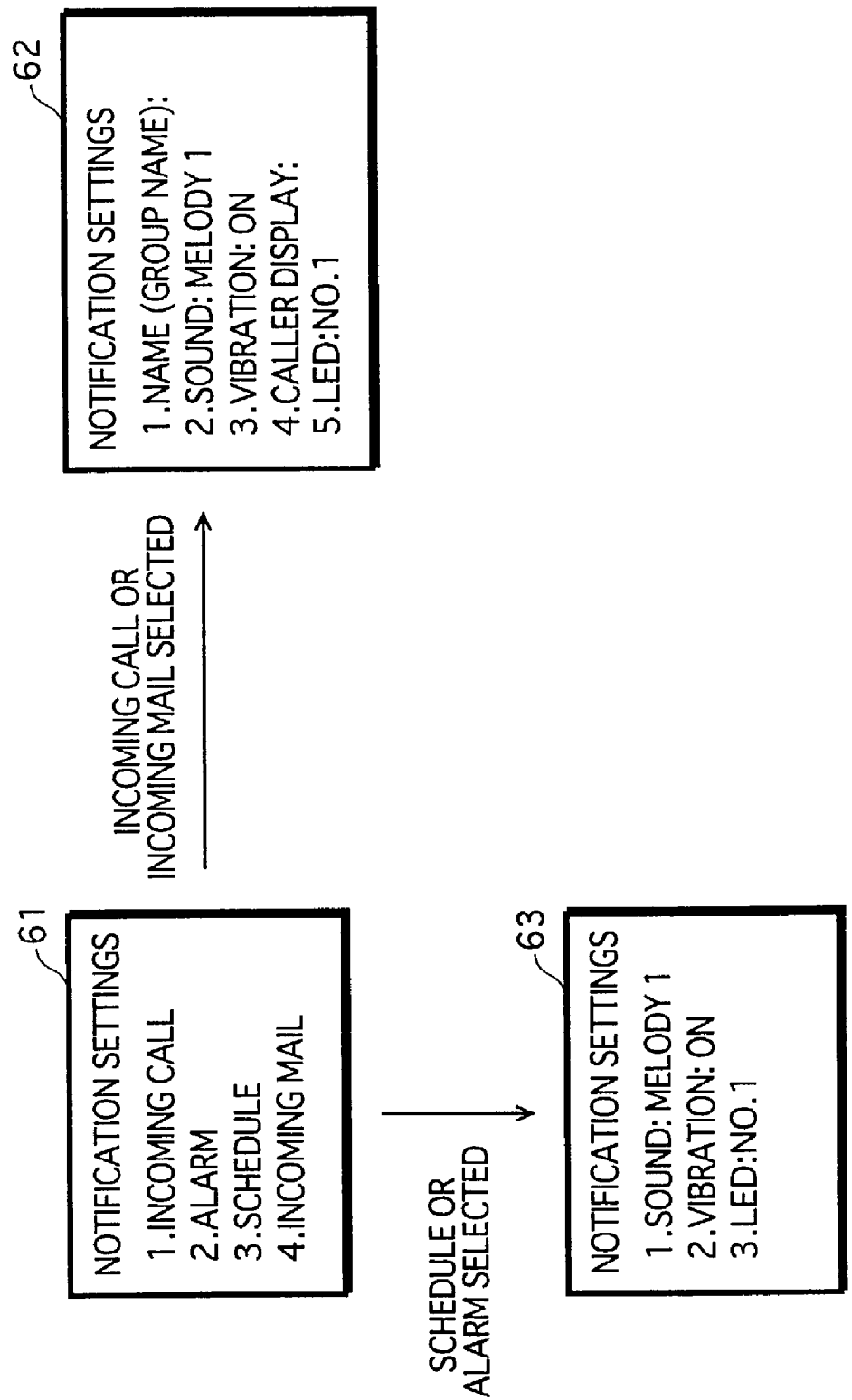
FIG. 10 is a screen transition diagram relating to notification settings.

FIG. 9 and FIG. 10 are used to describe a method for selecting the means by which the user is notified of an event. FIG. 9 is a flowchart relating to notification settings, and FIG. 10 is a transition diagram of screens relating to notification settings. As shown in FIG. 9, on the user pressing the S button in the operation unit 13 of the communication apparatus, the communication apparatus displays an LED setting screen of the display unit 12 (61 in FIG. 10). The LED setting screen displays the following: 1. INCOMING CALL, 2. ALARM, 3. SCHEDULE, 4. INCOMING MAIL. The user selects and event for which notification setting is to be performed, by pressing the number on the numeric key pad that is assigned to the event (step S21).

While the screen shown by 61 in FIG. 10 is displayed on the display unit 12, the user is able to select incoming call LED setting by pressing the "1" button (step S22), alarm LED setting by pressing the "2" button (step S23), schedule LED setting by pressing the "3" button (step S24), and incoming mail LED setting by pressing the "4" button (step S25).

On the user selecting notification setting for either alarm or schedule, the communication unit displays the screen shown by 63 in FIG. 10 on the display unit 12. The user views the screen shown by 63 in FIG. 10, and is able to set the notification means for schedule or alarm. Possible notification means are sound, vibration, and light emission (LED) (step S26).

The user is able to select sound setting by pressing the "1" button (step S29), and then select the type of sound (step S33). When the selection has been received from the user, the notification setting is complete.

The user is able to select vibration setting by pressing the "2" button (step S31), and then select whether to turn the vibration ON or OFF (step S35). When the selection has been received from the user, the notification setting is complete.

The user is able to select light emission setting by pressing the "3" button (step S30), and then select the color (step S34). When the selection has been received from the user, the notification setting is complete.

On the other hand, if the user selects incoming call notification setting or incoming mail notification setting, the communication apparatus displays a screen shown by 62 in FIG. 10 on the display unit 12. The user first operates the buttons in the operation unit 13 to designate a name or a group name (step S27). Specifically, when the display unit 12 displays the screen shown by 62 in FIG. 10, the cursor is on "1. NAME (GROUP NAME)", therefore the user operates the buttons in the operation unit 13 to input a name or a group name. Next, the user is able to set items displayed on the screen shown by 62 in FIG. 10. These items are sound, vibration, light emission (LED) and caller display (step S28). Sound, vibration and light emission (LED) settings are the same as described for schedule and alarm notification settings. When the item selected by the user is schedule (step S32), the user is able to select whether to turn ON or OFF a setting for displaying the telephone number of the caller when a call is received or displaying a name that is stored in correspondence with the telephone number when a call is received (step S35). When the selection has been received from the user, the notification setting is complete.

3. Modifications

Note that the present invention is not limited to the above-described embodiments. Cases such as the following are included in the present invention.

(1) The communication apparatus of the present invention is not limited to being the mobile telephone described in the embodiments, but instead may be a wired, desktop telephone, or a transceiver.

(2) The light emitting unit in the communication apparatus of the present invention is not limited to emitting seven colors, and may be a light emitting apparatus that emits more colors.

(3) The communication apparatus of the present invention may have a function for receiving from the user designations to individually correspond each of a plurality of communication addresses stored in the storage unit with a light emission pattern.

(4) The communication apparatus of the present invention may include a function for receiving from the user designations to individually correspond each of a plurality of names that are corresponded with communication addresses stored in the storage unit with a light emission pattern.

(5) The communication apparatus of the present invention may include a grouping function for grouping one or more names designated by the user from among the names corresponded with the communication addresses stored in the storage unit, and a function receiving from the user a designation of a light emission pattern to be corresponded with the group.

(6) In the communication apparatus of the second embodiment original light emission patterns are created by selecting the light emission color and length of each of two time slots in the original light emission pattern. However, the number of time slots in an original light emission pattern may be, for example, three, four, or any number designated by the user. Take for example a case in which the user designates the number of time slots in an original light emission pattern as six, i.e., S1 to S6. The user may designate time slot S1 as red for 0.5 seconds, time slot S2 as blue for 1 second, time slot three as green for 0.5 seconds, time slot S4 as yellow for 1 second, time slot S5 as purple for 0.5 seconds, and time slot S6 as cyan for 1 second.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A communication apparatus that notifies a user that one of a plurality of events has occurred, comprising;
- a first reception unit operable to receive from the user, for each time slot that composes a light emission pattern, designation of a light emission color or non-emission, as a light emission attribute of the time slot;
- a second reception unit operable to receive a designation of an event to be corresponded with the light emission pattern;
- a detection unit operable to detect that one of the plurality of events has occurred;
- a light emitting unit operable, when the detection unit detects that the event has occurred, to emit light based on the light omission pattern designated In correspondence with the event; and
- a third reception unit operable to receive from the user a designation of a time length of at least one time slot.

2. The communication apparatus of claim 1, wherein, the light omission pattern is composed of two colors, and when the detection unit detects that one of the events has occurred, the light emitting unit repeatedly emits light based on the light emission pattern designated in correspondence with the event.

3. The communication devices of claim 1, wherein; the plurality of events includes voice communication reception and non-voice communication reception, the first reception unit receives from the user, for each time slot in a first light emission pattern and a second light emission pattern, designation of a light emission color or non-emission, the second reception unit receives from the user designation to correspond voice communication reception with the first light emission pattern and designation to correspond non-voice communication reception with the second emission pattern,and when the detection unit detects voice communication reception, the light emitting unit emits light based on the first light emission pattern, and when the detection unit has detected non-voice communication reception, the light emitting unit emits light based on the second light emission pattern.

4. The communication device of claim 1, wherein the plurality of events includes incoming communication, and the communication device further comprises:

a storage unit operable to store a communication address and name in correspondence;

a fourth reception unit operable to receive from the user designation to correspond the stored name with the light emission pattern;

a communication address obtaining unit operable to, when incoming communication is received, obtain a communication address of the incoming communication;

wherein, when the detection unit detects the incoming communication and the obtained communication address is the communication address for which the fourth reception unit received the designation, the light emitting unit emits light based on the light emission pattern corresponded with the name that is corresponded with the communication address.

5. The communication apparatus of claim 1, wherein the plurality of events includes incoming communication, and the communication apparatus further comprises:

a storage unit operable to store a plurality of communication addresses and a plurality of names in correspondence a grouping unit operable to group one or more of the stored plurality of names designated by the user into one group; and a group reception unit operable to receive from the user designation to correspond the group with the light emission pattern; and a communication address obtaining unit operable to, when incoming communication is received, obtain a communication address of the incoming communication, wherein, when the detection unit detects incoming communication and the obtained communication address is a communication address that is corresponding with one of the names included in the group, the light emitting unit emits light based on the light emission pattern.

6. The communication device of claim 1, wherein the plurality of events includes incoming communication, and the communication device further comprises:

a storage unit operable to store a plurality of communication addresses;

a fourth reception unit operable to receive from the user designation to correspond one of the stored communication addresses with the light emission pattern;

a communication address obtaining unit operable to, when incoming communication is received, obtain a communication address of the incoming communication, wherein, when the detection unit detects the incoming communication and the obtained communication address is the communication address for which the forth reception unit received the designation, the light emitting unit emits light based on the light emission pattern corresponded with the communication address.

7. The communication apparatus of claim 1, further comprising:

a clock;

a date storage unit operable to receive from user designation of a date, and store the date; and a date reception unit operable to receive designation of a light emission pattern to be emitted by the light emitting unit when the designated date is reached.

8. The communication apparatus of claim 1, further comprising:

a clock;

a time storage unit operable to receive from the user designation of a time, and store the time; and a time reception unit operable to receive designation of a light pattern to be emitted by the light emitting unit when the designated time is reached.

9. The communication apparatus of claim 1, wherein the light emitting unit includes a red LED element a blue LED element and a green LED element, and emits light in any of seven colors that are realized by combinations of whether each of the LEDs is ON or OFF.

10. The communication device of claim 8, wherein the light emitting unit has a four-terminal structure, and further comprises:

a control unit operable to control each LED element independently.

11. The communication apparatus of claim 1, further including a display unit for displaying a menu of a plurality of color patterns to enable the user to designate a color pattern for the light emission pattern from the menu.

12. The communication apparatus of claim 11 wherein the display unit displays a plurality of time lengths to enable the user to designate a time length for the time slot to customize the light emission pattern.

* * * * *